United States Patent [19]

Schmidt

[11] Patent Number: 4,465,366

[45] Date of Patent: Aug. 14, 1984

[54] DEVICE FOR THE PHOTOELECTRIC DETERMINATION OF THE POSITION OF AT LEAST ONE FOCAL PLANE OF AN IMAGE

[75] Inventor: Horst Schmidt, Wetzlar, Fed. Rep. of Germany

[73] Assignee: Ernst Leitz Wetzlar GmbH, Wetzlar, Fed. Rep. of Germany

[21] Appl. No.: 312,122

[22] Filed: Oct. 16, 1981

[30] Foreign Application Priority Data

Oct. 18, 1980 [DE] Fed. Rep. of Germany ....... 3039425

[51] Int. Cl.³ .......................... G01C 3/10; G01C 3/08
[52] U.S. Cl. .......................................... 356/1; 356/4; 356/354; 356/356; 356/390
[58] Field of Search ....................... 356/1, 4, 354, 356, 356/390

[56] References Cited

U.S. PATENT DOCUMENTS 3,969,019 7/1976 Nohda ................................. 356/390
4,011,445 3/1977 O'Meara ................................ 356/4
4,071,772 1/1978 Leitz et al. ............................. 356/4

OTHER PUBLICATIONS

J. R. Meyer-Arendt, *Classical and Modern Optics*, 1972, Prentice Hall, p. 137.

Primary Examiner—S. C. Buczinski
Attorney, Agent, or Firm—Schwartz, Jeffery, Schwaab, Mack, Blumenthal & Koch

[57] ABSTRACT

Disclosed is a device for the photoelectric determination of the position of a focal plane of an image with an optical correlator. The invention comprises an imaging system, a grating structure located in the focal plane of the imaging system to function as a spatial frequency filter and a photoelectric receiver system. Light fluxes originating from an unknown object pass through the imaging system, and are modulated by the spatial frequency filter with the resulting light fluxes being converted into a display or control signal. The device includes an optical sensor for responding to mechanical or thermal variations which could affect the light fluxes of the optical correlator and which produces a display or correction signal. The device may be equipped with photoelectric receiver means sensitive to light in different spectral ranges and have means to selectively insert one or the other of the photoelectric receiver means into the optical correlator system. In accordance with the present invention, a catadioptric system is used as the imaging system and the grating structure of the optical correlator is positioned in the focal plane of the catadioptric system.

21 Claims, 4 Drawing Figures

DEVICE FOR THE PHOTOELECTRIC DETERMINATION OF THE POSITION OF AT LEAST ONE FOCAL PLANE OF AN IMAGE

BACKGROUND OF THE INVENTION

1. Field of the Invention

The present invention relates generally to a device for the photoelectric determination of the position of at least one focal plane of an image with an optical correlator.

2. Background of the Invention

Photoelectric position sensing devices are known in the art. U.S. Pat. No. 4,071,297 describes a process and apparatus for the measurement of distances by means of an optical correlator comprising an optical imaging means, a grating structure arranged in the vicinity of the image plane of the optical means to act as a spatial frequency filter and at least one photoelectric receiver system coordinated with it. In order to measure the distance of an object, i.e., to determine the position of the image focal plane, the grating structure jointly modulates a plurality of luminous fluxes, the fluxes passing through different areas of the entrance pupil of the optical imaging means. The fluxes are split, either by geometric or physical means or through an additional modulation corresponding to the respective areas of the pupil. The fluxes are then applied, either successively to a common photoelectric receiver, or simultaneously to separate photoelectric receivers. The output signals of the receivers serve to actuate a display and/or readjustment device.

The primary disadvantage of the device described in U.S. Pat. No. 4,071,297 is to be found in the fact that variations, for example, mechanical or thermal variations, within the apparatus may lead to signal deterioration or even signal falsifications. For this reason, it has already been proposed in U.S. Pat. No. 4,037,958 to provide an optical sensor in an apparatus as described hereinabove with regard to U.S. Pat. No. 4,071,297, capable of responding to such variations, which result, e.g., from thermal effects, for producing electrical signals which can be used to indicate and/or to correct the variations and hence their optical effects.

To determine the position of the focal plane of an image in devices of the above-described type, luminous fluxes belonging to the visible range of light are used. Measurements with wave lengths of the invisible ranges or ranges closely adjacent to the visible of light would require expensive and time-consuming modifications of the above-described devices.

SUMMARY OF THE INVENTION

It is therefore an object of the present invention to provide a device whereby the position of the focal plane of an image may be determined.

It is a further object of the invention to provide a device whereby the position of a focal plane of an image may be determined from light fluxes having wave lengths located in the visible or invisible spectral ranges or in the range adjacent to the visible spectral range of light.

It is a further object of the invention to provide a device capable of being switched alternatively from one spectral range to another.

It is a still further object of the invention to provide a device for determining the position of a focal plane of an image in a device having a compact structural layout.

To achieve the foregoing and other objects in accordance with the purpose of the present invention as embodied and broadly described herein and in accordance with the present invention, a catadioptric system is used as a correlator-imaging system with the grating structure of the optical correlator located in the focal plane of the catadioptric system.

The device of the present invention may preferably be provided wth two photoelectric receiver systems of different spectral sensitivities and with means for an alternate evaluation of the light fluxes resulting from the cooperation of the object images with the grating structure through one or the other of the photoelectric transducer systems.

Also in accordance with the invention, there is disclosed a device for the photoelectric determination of the position of at least one focal plane of an image with an optical correlator. In one aspect of the invention, the device comprises an imaging system, a grating structure arranged in the vicinity of the image plane of the imaging system as a spatial frequency filter and at least one photoelectric receiver system following the spatial frequency filter. It is preferred that the light fluxes originating from an unmarked object and passing through different areas of the pupil of the imaging system are jointly modulated by the spatial frequency filter and that the light fluxes resulting from the cooperation of the object images and the grating structure are converted to electric signals for display and/or control purposes. It is a further aspect of the present invention to use an optical sensor capable of responding to mechanical or thermal variations affecting the light fluxes of the optical correlator to produce electric signals which can be used for the display and/or correction of the mechanical or thermal variations or their optical effects. Preferably, the optical sensor utilizes parts of the catadioptric system for imaging reference markers on the grating structure of the optical correlator which is located in the focal plane of the catadioptric system.

In another aspect of the invention, it is preferred to use one or two photoelectric receiver systems of different spectral sensitivities alternately, together with means for permitting the alternating evaluation of the light fluxes resulting from the cooperation of the object images with the grating structure.

It is further preferred to use at least one beam splitter having a dividing layer that is either reflective of or transparent to the light radiation in a spectral range corresponding to the photoelectric receiver system for the alternating evaluation.

It is also preferred that the grating structure in the focal plane of the catadioptric systems consists of two grating structures, tuned to different spectral ranges (for alternative insertion into the beam path) and located in the beam path of the catadioptric system. A secondary mirror of this system is preferably supported pivotingly on a horizontal axis perpendicular to its optical axis.

It is further preferred that the focal plane of the catadioptric system's two grating structures are adjusted for two different spectral ranges and are located, for alternative insertion, into the beam path of the catadioptric system. In this regard, the grating structures are displaceable in the focal plane.

It is still further preferred that the grating structure is in the form of a reflecting grating, that the grating structure or structures are movingly supported and that means are provided for the oscillating or continuous movement of the grating structure or structures.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

In the drawings, exemplary embodiments of the invention are represented schematically and are described in more detail hereinafter. In the drawings.

DETAILED DESCRIPTION OF PREFERRED EMBODIMENTS

Figure 1:
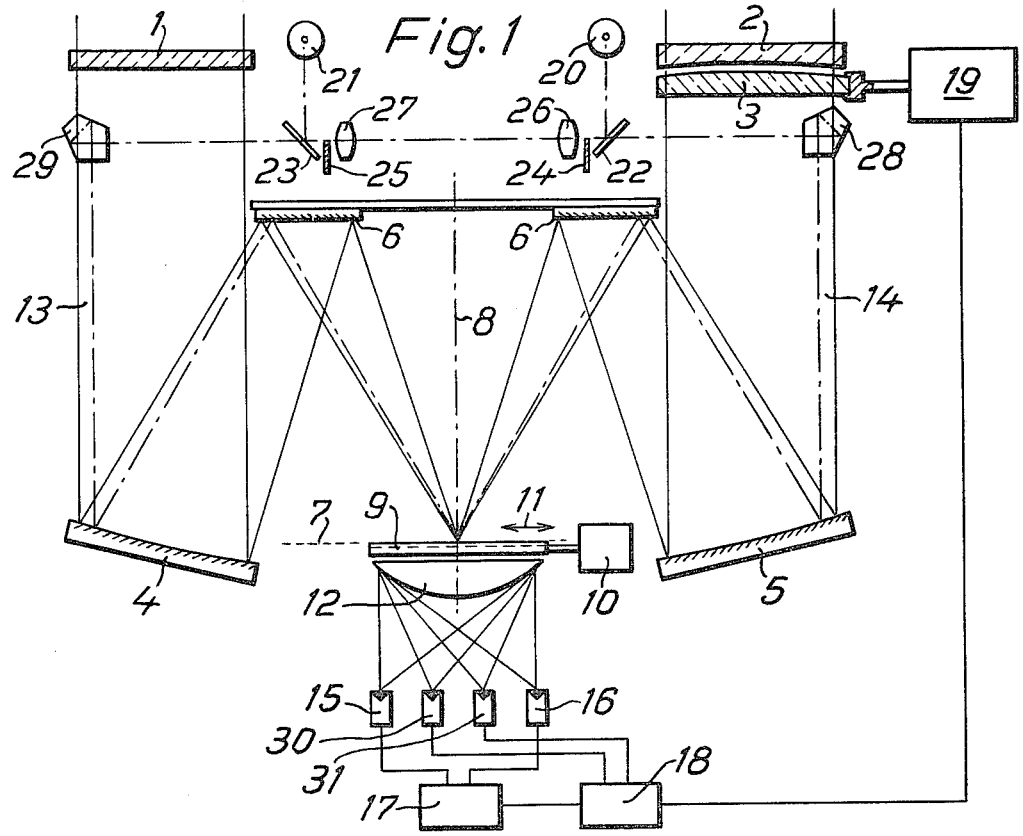
FIG. 1 is a schematic cross-sectional view of a device according to the present invention.

FIG. 1 shows in a schematic view a range finder operating with optical correlation, the imaging system of the range finder consisting of a catadioptric system. The system consists of a shutter disk 1, a displacement system consisting of lens 2 and lens 3, the principal mirrors 4 and 5 and a secondary mirror 6. A grating structure 9 is arranged in the focal plane 7 of the catadioptric system 1–6, and the focal plane 7 is perpendicular to the optical axis 8 of the catadioptric system 1–6. The grating structure 9 is displaceable by means of a drive 10 in the direction of the double arrow 11 to perform an oscillating or continuous movement.

Following the grating structure 9 on the direction of the beam path, there is mounted a field lens 12. It serves the function of imaging different pupil regions 13 and 14 on the photoelectric receiver systems 15 and 16.

A comparative stage 17 follows the photoelectric receiver systems 15, 16 in series and compares the phases of the standing electric signals arising at the outputs of the receiver systems 15, 16 and in turn produces a signal which is processed into a control signal in a process circuit 18 similar to the computer 39 of U.S. Pat. No. 4,037,958 following the comparative stage 17. The control signal may regulate the setting of the displaceable lens 3 by means of a servomechanism 19.

The device described hereinabove operates in the following manner:

The division of the catadioptric system 1–6 into a left and a right side, 1, 2 and 3, respectively, effects the splitting of the entrance pupil of the system into the diametrical pupil areas 13 and 14. The light fluxes originating in these areas are guided by means of the principal mirrors 4 and 5 to the secondary mirror 6, which in turn focuses them on the focal plane 7. The oscillating or continuously moving grating structure 9 located therein modulates the light fluxes. The field lens 12 following the grating structure 9 images the pupil areas 13 and 14 on the photoelectric receiver systems 15 and 16, which are being periodically exposed as the result of the moving grating structure 9. As described hereinabove, the comparative stage 17 compares the electric signals originating in the exposure of the photoelectric receiver systems with respect to their phase positions. The position of the focal plane of an object image, from which the distance of that object may be derived, is then determined in a conventional manner similar to that disclosed at lines 4 and 5 of the specification of U.S. Pat. No. 4,071,297, once the same phase relationship, or phase coincidence, is obtained.

The continuous light component of the signals obtained in this manner may be eliminated by the use of groups of receivers producing inversely phased signals, which moreover exhibit a particularly strong amplitude maximum in the case of coincidence in the positions of the image plane and the grating plane.

It will be appreciated by one of skill in the art that the device described above is susceptible to potential interference resulting from the mechanical displacement of the various optical structural elements, for example, by thermal effects. The effects of these displacements and the resulting interference could then act to produce false results.

In order to recognize such displacements and to eliminate their effects, the device shown in FIG. 1 is supplemented by an assembly capable of responding to mechanical variations which would otherwise affect the light fluxes of the optical correlation range finder of the present invention.

The assembly comprises, for each of the beam paths of both the left and the right hand side (1, 2 and 3, respectively) of the catadioptric system 1–6, a source of light 20 and 21, each emitting a beam of light. These beams of light illuminate, by means of deflecting mirrors 22 and 23, respectively, mark carriers 24 and 25, respectively, which are imaged by the optical systems 26 and 27. By means of two deflecting prisms, 28 and 29, the beams leaving the optical systems 26 and 27 are coupled with the beams of the pupil areas 13, 14 and are passed to the principal mirrors 4 and 5 and the secondary mirrors 6, to reach the focal plane 7. The spatial position of the structural parts 20–29 producing these reference beams is such that the images of the mark carriers produced by them do not interfere with the images of the pupil areas 13, 14. In the case shown, the images of the mark carriers 24, 25 are also reproduced on the grating structure 9; however, corresponding to the movement of the grating, as known, for example, U.S. Pat. No. 4,071,772 in another line position. The photoelectric receiver systems 30, 31 are coordinated with the areas of the images of the mark carriers 24 and 25. The output signals of the receiver systems 31 and 32 therefore represent a measure of the mechanical variations affecting the light fluxes of the optical correlator 1 to 9. These signals are transmitted to the processing circuit 18, where the variations are computed. However, the output signal may also be used to actuate a compensating control device.

Figure 2:
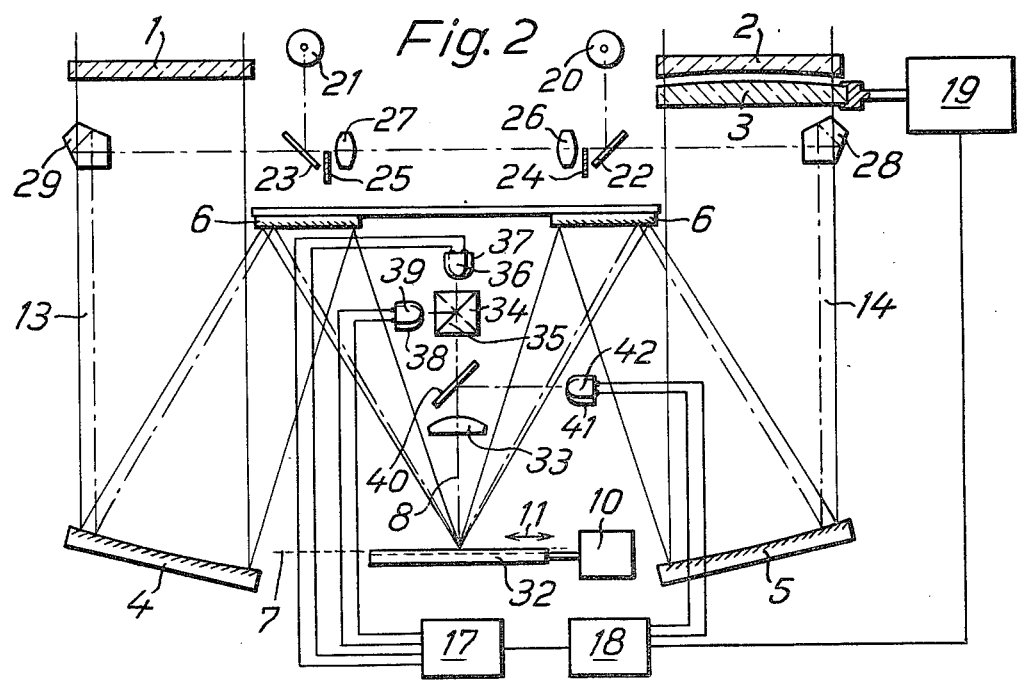
FIG. 2 is another schematic cross-sectional view of a device according to the present invention with a beam splitter for the alternating evaluation of light fluxes of different spectral ranges.

In the embodiment shown in FIG. 2, the light transmitting grating structure 9 of FIG. 1 is replaced by an incident light (reflective grating) grating structure 32. A lens 33 is inserted into the reflecting beam path for imaging of the different pupil areas 13 and 14. A beam splitter 34 having a dividing layer 35 is further arranged in this beam path, the dividing layer 35 being transparent to radiation of one predetermined spectral range and reflective with respect to radiation of another spectral range.

The beam splitter 34 may also be mounted in a pivoting device, so that upon pivoting by 90° the beam splitter 34 and therefore also of the dividing layer 35, the images of the pupil areas 13, 14 are alternatingly impacting upon the photoelectric receivers 36,37 and 38, 39 respectively; the sensitivity of photoelectric receivers 36 and 37 is adjusted to radiation of different spectral ranges from that of receivers 38 and 39.

The electric signals produced in the receiver systems 36, 37, and 38, 39 respectively, are processed in a manner similar to that described in connection with FIG. 1.

To detect and to eliminate mechanical variations within this second embodiment of the optical correlation rangefinder, as also in the case of the device shown in FIG. 1, the apparatus of FIG. 2 can be supplemented with an arrangement capable of responding to such variations. It differs from the assembly shown in FIG. 1 mainly by a deflecting mirror 40 positioned after the lens 33 in the area of the light flux reflected by the reflection grating 32, to effect the separation of the reference beam from the beams of the pupil areas 13 and 14. The reflecting mirror 40 serves to direct onto the photoelectric receiver systems 41 and 42 the light fluxes from the images of the mark carriers 24,25, likewise modulated by the reflection grating 32. The output signals of the photoelectric receiver systems 41 and 42 are processed in the processing circuit 18, as described with regard to FIG. 1, or they are used to actuate a compensating control device.

Figure 3:
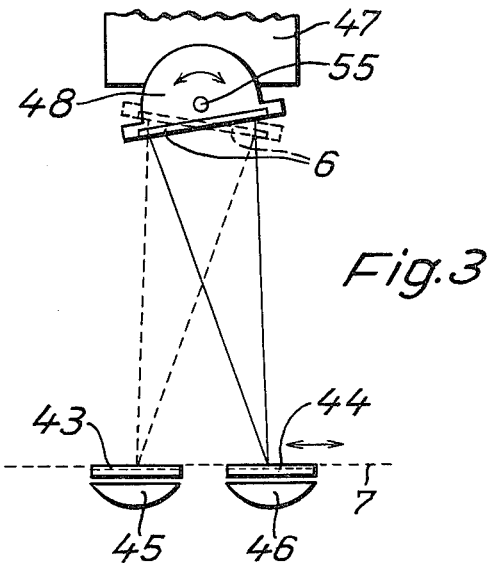
FIG. 3 schematically illustrates in detail another embodiment for the alternating evaluation of light fluxes of different spectral ranges.

Alternatively, for operation of the present invention in either the visible or invisible spectral ranges of light, it is also within the scope of the present invention to provide grating structures adjusted to different spectral ranges and capable of being alternately switched into use. Such a possible switching layout is illustrated in FIG. 3.

In the focal plane 7 of the secondary mirror 6, grating structures 43 and 44 are arranged; the grating structure is capable of oscillating or continuously moving in the direction of the double arrow 91. Each grating is tuned to a predetermined spectral range. To reproduce the pupil areas 13 and 14 on the photoelectric receiver systems (not shown here), the grating structures 43 and 44 are followed by field lenses 45 and 46. Switching from one to the other grating structure is effected by means of a secondary mirror 6, which for this purpose is mounted on a semicylinder 48 located in a housing 47. By means of a conventional adjusting device, such as, for example, a lever, tie-rods or the like, the semi-cylinder 48 carrying the secondary mirror 6 is pivoted about axis 55, perpendicular to its optical axis, until the light fluxes from the pupil segments 13 and 14 are directed onto the grating structure adjusted to the spectral range wherein the device is to operate.

Figure 4:
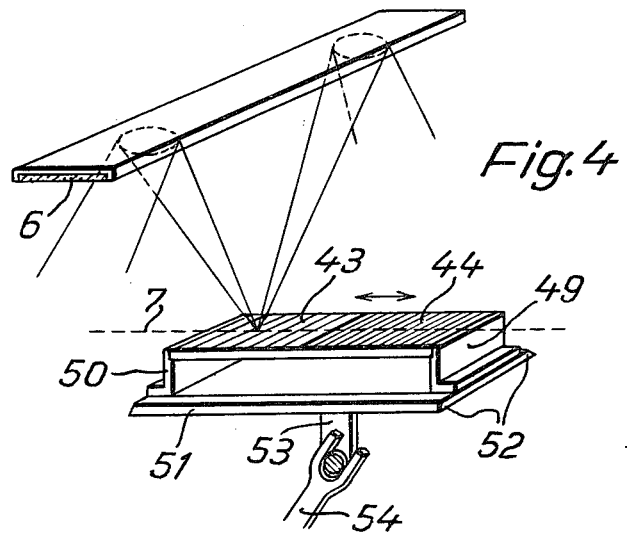
FIG. 4 is a perspective view of another embodiment for the alternating evaluation of light fluxes of different spectral ranges.

An alternate switching mode is shown in FIG. 4. In this embodiment the grating structures 43 and 44 held in piezo benders are mounted on a slide 51 which runs in a guide as indicated by the dovetail-like configuration 52 of the bottom side of the slide. An articulated element 53 is fastened to the bottom side of the slide and is engaged by a claw lever 54. When the claw lever 54 is tilted, the grating structures 43 and 44 are displaced in the focal plane 7 of the secondary mirror 6, so that they are penetrated by the light fluxes of the spectral range to which they are tuned.

In the embodiments depicted, the reference beam of the defect (or displacement) detection assembly is always coupled with the light fluxes of the spectral range wherein the device is intended to operate. The reference beam is modulated by the same grating structure which modulates the light fluxes from the different pupil areas. It should be understood that the reference beam should be modulated (pulsed) additionally so that its decoupling from the light fluxes used for measuring may be more easily effected.

It is also within the scope of the present invention to arrange the device such that the reference beam is not coupled to the beams from the different areas of the pupil and that it is modulated by a separate grating structure.

The foregoing description of a preferred embodiment of the present invention has been presented for purposes of illustration and description. It is not intended to be exhaustive or to limit the invention to the precise form disclosed, and obviously many variations and modifications are possible in light of the above teaching. It is intended that the scope of the invention be defined by the claims appended hereto.

I claim:

1. An apparatus for photoelectrically determining the position of a focusing plane of an image comprising an optical correlator including an optical axis and an imaging system for imaging an object onto an imaging plane, at least one spatial frequency filter mounted in the vicinity of said image plane of said imaging system, a photoelectric receiver means responsive to light fluxes leaving said spatial frequency filter to generate electrical signals and means for processing said electrical signals, said imaging system comprising a catadioptric optical imaging means having a beam path wherein said imaging plane comprises a focal plane of said catadioptric optical imaging means and wherein said spatial frequency filter is operable to jointly modulate light fluxes traversing different pupil regions of said catadioptric optical imaging means, and said electrical signals generated by said photoelectric receiver means are indicative of positions in said imaging plane, an optical sensor means, responsive to mechanical variations within said apparatus which affect said light fluxes, for generating electrical signals indicative of said mechanical variations.

2. The apparatus of claim 1, wherein said spatial frequency filter comprises a grating means.

3. The apparatus of claim 2, wherein the grating means further comprises at least two grating structures, each tuned to different spectral ranges and means for selectively inserting one of said at least two grating structures in said beam path.

4. The apparatus of claim 3, wherein the means for selectively inserting one of said at least two grating structures in said beam path incorporates said secondary mirror of said catadioptric optical imaging means for directing said beam path onto said grating means, said secondary mirror having a horizontal axis and an optical axis and being pivotingly supported on said horizontal axis, substantially perpendicular to said optical axis.

5. The apparatus of claim 3, wherein the means for selectively inserting one of said at least two grating structures in said beam path comprises means for displacing the grating means in said focal plane.

6. The apparatus of claim 2 or 3, wherein the grating means is a reflective grating.

7. The apparatus of claim 2 or 3, wherein the grating means is movingly supported and further comprising a drive means for continuously moving said grating means.

8. The apparatus of claim 1, wherein the electrical signals generated by said optical sensor means are further indicative of optical effects of said mechanical variations.

9. An apparatus for photoelectrically determining the position of a focusing plane of an image comprising:
an optical correlator having an optical axis and including an imaging system for imaging an object onto an imaging plane, a spatial frequency filter mounted proximate said image plane, a photoelectric receiver means responsive to light fluxes from said spatial frequency filter for generating electrical signals, and processing means for generating a control signal from said electrical signals;
said imaging system comprising a catadioptric optical imaging means having a beam path wherein said imaging plane comprises a focal plane of said catadioptric optical imaging means;
said spatial frequency filter being operable to jointly modulate light fluxes traversing different pupil regions of said catadioptric optical imaging means whereby said electrical signals are indicative of positions of said imaging plane, said spatial frequency filter further comprising a plurality of filters each tuned to different spectral ranges and operable to be selectively inserted into said beam path;
said optical sensor comprising photoelectric receiver means responsive to mechanical variations within said apparatus which affect said light fluxes for generating a mechanical variation signal indicative of mechanical variations within said apparatus.

10. The apparatus of claim 9, wherein said mechanical variation signal is further indicative of optical effects of said mechanical variations.

11. The apparatus of claim 9, wherein said plurality of filters comprises at least two grating structures, each tuned to different spectral ranges and means for selectively inserting one of said at least two grating structures in said beam path.

12. The apparatus of claim 11, wherein the means for selectively inserting one of said at least two grating structures in said beam path incorporates a secondary mirror of said catadioptric optical imaging means for directing said beam path onto said grating means, said secondary mirror having a horizontal axis and an optical axis and being pivotingly supported on said horizontal axis, substantially perpendicular to said optical axis.

13. The apparatus of claim 11, wherein the means for selectively inserting one of said at least two grating structures in said beam path comprises means for displacing the grating means in said focal plane.

14. The apparatus of claim 1 or 9, wherein said catadioptric optical imaging means comprises a shutter disk, a lens means, a principal mirror means and a secondary mirror.

15. The apparatus of claim 14, wherein said lens means comprises at least two lenses, one of said at least two lenses being displaceable.

16. The apparatus of claim 14, further comprising means connected to said displaceable lens for setting its position.

17. The apparatus of claim 1 or 9, wherein the photoelectric receiver means consists of at least two photoelectric receiver systems of different spectral sensitivies and means for selectively operating one of said at least two photoelectric receivers at a time.

18. The apparatus of claim 17, wherein said means for selectively operating consists of a beam splitter having a dividing layer which is reflective of radiation of one predetermined spectral range and transparent to radiation of another spectral range.

19. The apparatus of claim 1 or 9, wherein said optical sensor means further includes a light source, an optical path including at least one mark carrier, an photoelectric receiver system and a processing means connected to said photoelectric receiver system for generating a variation signal.

20. The apparatus of claim 19, wherein said optical path further comprises at least one deflecting mirror, an optical system and at least one deflecting prism.

21. The apparatus for claims 1 or 9 further comprising a field lens between said spatial frequency filter and said photoelectric receiver system.

* * * * *